(12) United States Patent
Sakae et al.

(10) Patent No.: US 11,885,047 B2
(45) Date of Patent: Jan. 30, 2024

(54) TWISTED CORD OF LIQUID-CRYSTAL POLYESTER MULTIFILAMENTS, PRODUCTION METHOD THEREFOR, AND PRODUCT COMPRISING SAID TWISTED CORD

(71) Applicant: Toray Industries, Inc., Tokyo (JP)

(72) Inventors: Ryosuke Sakae, Okazaki (JP); Hisatoshi Tanaka, Okazaki (JP); Munekazu Matoba, Okazaki (JP)

(73) Assignee: TORAY INDUSTRIES, INC., Tokyo (JP)

( * ) Notice: Subject to any disclaimer, the term of this patent is extended or adjusted under 35 U.S.C. 154(b) by 820 days.

(21) Appl. No.: 16/971,161

(22) PCT Filed: Feb. 26, 2019

(86) PCT No.: PCT/JP2019/007220
§ 371 (c)(1),
(2) Date: Aug. 19, 2020

(87) PCT Pub. No.: WO2019/167923
PCT Pub. Date: Sep. 6, 2019

(65) Prior Publication Data
US 2021/0087332 A1 Mar. 25, 2021

(30) Foreign Application Priority Data
Mar. 2, 2018 (JP) ................ 2018-037381

(51) Int. Cl.
| | | |
|---|---|---|
| *D02G 3/02* | (2006.01) | |
| *D03D 15/283* | (2021.01) | |
| *D01F 6/62* | (2006.01) | |
| *D02G 3/22* | (2006.01) | |
| *D03D 15/62* | (2021.01) | |

(52) U.S. Cl.
CPC ............. *D02G 3/02* (2013.01); *D01F 6/62* (2013.01); *D02G 3/22* (2013.01); *D03D 15/283* (2021.01); *D03D 15/62* (2021.01)

(58) Field of Classification Search
CPC ... D02G 3/02; D02G 3/22; D01F 6/62; D03D 15/283; D03D 15/62
See application file for complete search history.

(56) References Cited

U.S. PATENT DOCUMENTS

| | | | | |
|---|---|---|---|---|
| 9,011,743 B2 * | 4/2015 | Funatsu | .................... | D01F 6/84 |
| | | | | 264/236 |
| 9,920,457 B2 | 3/2018 | Kim | | |
| 2011/0318982 A1 * | 12/2011 | Funatsu | ................. | D01D 10/02 |
| | | | | 428/401 |

FOREIGN PATENT DOCUMENTS

| | | | | | |
|---|---|---|---|---|---|
| CA | 2276496 A1 | * | 12/1999 | ............... | D01F 6/62 |
| JP | 09296324 A | | 11/1997 | | |
| JP | 2003342845 A | | 12/2003 | | |
| JP | 2005307389 A | | 11/2005 | | |
| JP | 2013155089 A | | 8/2013 | | |
| JP | 2014145148 A | | 8/2014 | | |
| JP | 2016191179 A | | 11/2016 | | |
| JP | 2018040076 A | | 3/2018 | | |
| JP | 2018040077 A | | 3/2018 | | |
| JP | 2018040078 A | | 3/2018 | | |
| KR | 20080082800 A | * | 9/2008 | | |
| KR | 20090115227 A | * | 11/2009 | | |
| KR | 20110126167 A | * | 11/2011 | | |

OTHER PUBLICATIONS

International Search Report and Written Opinion for International Application No. PCT/JP2019/007220, dated Jun. 4, 2019, 6 pages.

* cited by examiner

*Primary Examiner* — Shaun R Hurley
(74) *Attorney, Agent, or Firm* — RATNERPRESTIA

(57) ABSTRACT

The present invention addresses the problem of providing a twisted cord of liquid-crystal polyester multifilaments which gives various high-order processed products capable of retaining desired product shapes and which is suitable for use in general industrial material applications such as high-strength ropes, slings, and nets. The twisted cord of liquid-crystal polyester multifilaments has a coefficient of variation in longitudinal-direction cord diameter, X, of less than 30%.

11 Claims, No Drawings

TWISTED CORD OF LIQUID-CRYSTAL POLYESTER MULTIFILAMENTS, PRODUCTION METHOD THEREFOR, AND PRODUCT COMPRISING SAID TWISTED CORD

CROSS REFERENCE TO RELATED APPLICATIONS

This is the U.S. National Phase application of PCT/JP2019/007220, filed Feb. 26, 2019, which claims priority to Japanese Patent Application No. 2018-037381, filed Mar. 2, 2018, the disclosures of each of these applications being incorporated herein by reference in their entireties for all purposes.

FIELD OF THE INVENTION

The present invention relates to a twisted cord of liquid-crystal polyester multifilaments. More specifically, the present invention relates to a twisted cord of liquid-crystal polyester multifilaments that is suitable for use in general industrial material applications, a method for producing the twisted cord of liquid-crystal polyester multifilaments, and a product in which the twisted cord of liquid-crystal polyester multifilaments is used.

BACKGROUND OF THE INVENTION

A liquid-crystal polyester fiber is produced by melt spinning in which a liquid-crystal polyester polymer having a rigid molecular structure is used as a raw material, and the molecular chain is highly oriented along the fiber axis and heat-treated at high temperature for a long time. It is known that as a result of the above-described melt spinning, the highest strength and elastic modulus are exhibited in the liquid-crystal polyester fiber among fibers produced by melt spinning. It is also known that in the liquid-crystal polyester fiber, the heat resistance and the dimensional stability are improved by heat treatment because the molecular weight is increased and the melting point is raised by the heat treatment. Such a liquid-crystal polyester fibers is suitable for use in general industrial material applications such as ropes, slings, fishing nets, nets, meshes, woven fabrics, knitted fabrics, fabrics, sheet-shaped materials, belts, tension members, various reinforcing cords, and resin reinforcing fibers. In such general industrial material applications, one or a plurality of liquid-crystal polyester multifilaments are used and, for example, twisted to form a twisted cord, and then the twisted cord is often processed into various product shapes.

Patent Document 1 describes a bulky yarn for rubber reinforcement being a bulky processed yarn that includes filaments of a non-thermoplastic fiber having a single fiber fineness of 0.2 to 10 dtex, and has an R characteristic of 1.10 or more and a stretching elongation of 6% or more. However, in Patent Document 1, only the yarn diameters before and after the bulking are measured and evaluated as the R characteristic, and regarding the yarn (cord) obtained after the bulking, there is no description about the uniformity of the cord diameter in the longitudinal direction. In fact, since the bulky processed yarn described in Patent Document 1 is assumed to be suitable for use for rubber reinforcement, unevenness is formed in the longitudinal direction of the yarn in order to improve the rubber adhesion resistance by an anchor effect. Therefore, it is clear that the bulky processed yarn does not have a uniform diameter in the longitudinal direction of the yarn.

Patent Document 2 describes a continuous fiber reinforcement in which a fiber having a tensile strength of 12 cN/dtex or more and 60 cN/dtex or less is used, and when diameters at spots having larger sectional areas than the average sectional area of an arbitrary test piece having a length of 1 m are measured, and the average of the diameters of the points ranked in descending order by the diameter from first to fifth is represented by x, the ratio to the average diameter y of the test piece, x/y is 1.05 or more and 2.00 or less. However, in Patent Document 2, with respect to the continuous fiber reinforcement, diameters at spots having larger sectional areas than the average sectional area are measured, the average of the diameters of the points ranked in descending order by the diameter from first to fifth is represented by x, and only the ratio to the average diameter y, x/y is measured and evaluated, and regarding the obtained continuous fiber reinforcement, there is no description about the uniformity of the cord diameter in the longitudinal direction. In fact, in the production of the continuous fiber reinforcement in Patent Document 2, since unevenness is intentionally formed on a core material at regular intervals to impart an anchor effect in order to improve the adhesion performance to concrete, and a fiber is wound on the core material with a braid or a twisted yarn, it is clear that the continuous fiber reinforcement does not have a uniform diameter in the longitudinal direction of the yarn.

In Patent Document 3, by optimizing the twisted yarn in the first to the third stages, a twisted cord is formed having a circularity of 50% or more, and a porosity between yarns of less than 40% in the case of a multifilament. However, there is no description about the uniformity of the cord diameter in the longitudinal direction although the circularity of a twisted cord cross section is measured and evaluated. In fact, in Examples of Patent Document 3, it is clear that the twisted cords do not have a uniform diameter in the longitudinal direction of the yarn because all the twisted cords have a distorted cord shape although the circularity is 50% or more.

PATENT DOCUMENTS

Patent Document 1: Japanese Patent Laid-open Publication No. 2003-342845
Patent Document 2: Japanese Patent Laid-open Publication No. 2013-155089
Patent Document 3: Japanese Patent Laid-open Publication No. 2014-145148

SUMMARY OF THE INVENTION

In the liquid-crystal polyester fiber, the yarn itself also has a rigid form due to the property of the polymer, "rigidity". Therefore, when one or a plurality of liquid-crystal polyester multifilaments are twisted, the followability (deformation property) of each single fiber to the twisting is very low, and each single fiber is, for example, spread in the direction perpendicular to the longitudinal direction of the cord in the twisted cord, so that difference in yarn length occurs between the single fibers. As a result, the cord diameter of the obtained twisted cord of liquid-crystal polyester multifilaments varies in the longitudinal direction, so that there is a problem that desired product shapes cannot be obtained when the twisted cord is processed into various high-order processed products. Furthermore, because the difference in yarn length occurs in the twisted cord as described above, the stress applied from the outside tends to concentrate on the stretched single fiber, and there is a problem that the strength of the twisted cord is deteriorated. That is, even if a liquid-crystal polyester fiber having high mechanical properties (strength and elastic modulus) is used to form a twisted cord, a twisted cord having a uniform cord diameter in the longitudinal direction has not been obtained. In addition, because the original yarn strength developing property in the twisted cord (original yarn strength utilization rate) is low, the twisted cord has been difficult to use suitably in the processing into a product shape.

As described above, a twisted cord of liquid-crystal polyester multifilaments having a uniform cord diameter in the longitudinal direction has not been obtained by the conventional techniques.

Therefore, an object of the present invention is to provide a twisted cord of liquid-crystal polyester multifilaments having a cord diameter remarkably uniform in the longitudinal direction compared with that by the conventional techniques.

In order to solve the above-described problems, the present invention has the following configuration.

The present invention in an embodiment is a twisted cord of liquid-crystal polyester multifilaments, the twisted cord having a coefficient of variation in cord diameters in a longitudinal direction, X, of less than 30%, the coefficient of variation in cord diameters that is calculated from (Formula 1) described below:

coefficient of variation in cord diameters, $X$ (%)={standard deviation of cord diameters in a longitudinal direction, $\sigma$ (mm)÷average cord diameter, $D$ (mm)}×100     (Formula 1).

The present invention in one embodiment is also a method for producing the twisted cord of liquid-crystal polyester multifilaments, the method including twisting a liquid-crystal polyester multifilament having a yarn flexibility index S of 8.0 or less.

The present invention in embodiments is also a rope, a sling, or a net including the twisted cord of liquid-crystal polyester multifilaments.

The present invention in an embodiment is also a tension member including the twisted cord of liquid-crystal polyester multifilaments.

The present invention in an embodiment is also a woven or knitted fabric including the twisted cord of liquid-crystal polyester multifilaments.

The present invention in an embodiment is also a fiber-reinforced resin product or a resin molded product including the twisted cord of liquid-crystal polyester multifilaments.

Because the twisted cord of liquid-crystal polyester multifilaments according to embodiments of the present invention has a uniform cord diameter in the longitudinal direction, the twisted cord gives various high-order processed products capable of retaining desired product shapes, and is suitable for use in general industrial material applications such as high-strength ropes, slings, and nets. Furthermore, by using a liquid-crystal polyester multifilament having yarn flexibility, when one or a plurality of liquid-crystal polyester multifilaments are twisted, the followability (deformation property) of each single fiber to the twisting is very high, and each single fiber is uniformly twisted in the twisted cord, so that the difference in yarn length is remarkably improved between the single fibers, and the stress applied from the outside is uniformly dispersed over all the single fibers included in the twisted cord to remarkably improve the strength of the twisted cord.

DETAILED DESCRIPTION OF EMBODIMENTS OF THE INVENTION

The twisted cord of liquid-crystal polyester multifilaments according to embodiments of the present invention and a method for producing the twisted cord will be described in detail below.

Note that the method for producing the twisted cord of liquid-crystal polyester multifilaments according to the present invention is not limited as long as the twisted cord of liquid-crystal polyester multifilaments according to the present invention can be obtained, and preferable aspects will be described below.

The liquid-crystal polyester used in the twisted cord of liquid-crystal polyester multifilaments according to embodiments of the present invention refers to a polyester that exhibits optical anisotropy (liquid crystallinity) when heated and melted. The fact that the polyester exhibits optical anisotropy can be verified by placing a sample including the liquid-crystal polyester on a hot stage, raising the temperature to heat the sample under a nitrogen atmosphere, and observing the presence or absence of transmitted light through the sample with a polarizing microscope.

Examples of the liquid-crystal polyester used in the twisted cord of liquid-crystal polyester multifilaments according to embodiments of the present invention include a polymer of an aromatic oxycarboxylic acid (a), a polymer of an aromatic dicarboxylic acid, an aromatic diol, or an aliphatic diol (b), and a copolymer of (a) and (b) described above (c), and among them, a polymer including only aromatics is preferable. The polymer including only aromatics exhibits excellent strength and elastic modulus when formed into a fiber. A conventionally known method can be used for polymerization to prepare the liquid-crystal polyester.

Here, examples of the aromatic oxycarboxylic acid include hydroxybenzoic acid (p-hydroxybenzoic acid and the like), hydroxynaphthoic acid and the like (6-hydroxy-2-naphthoic acid and the like), and alkyl, alkoxy, or halogen substitution products thereof.

Examples of the aromatic dicarboxylic acid include terephthalic acid, isophthalic acid, diphenyldicarboxylic acid, naphthalenedicarboxylic acid, diphenyl ether dicarboxylic acid, diphenoxyethane dicarboxylic acid, diphenylethane dicarboxylic acid, and alkyl, alkoxy, or halogen substitution products thereof.

Examples of the aromatic diol include hydroquinone, resorcin, dihydroxybiphenyl, naphthalene diol, and alkyl, alkoxy, or halogen substitution products thereof, and examples of the aliphatic diol include ethylene glycol, propylene glycol, butanediol, and neopentyl glycol.

Preferable examples of the liquid-crystal polyester prepared by polymerizing the monomers and the like used in the present invention include a liquid-crystal polyester prepared by copolymerizing a p-hydroxybenzoic acid component and a 6-hydroxy-2-naphthoic acid component, a liquid-crystal polyester prepared by copolymerizing a p-hydroxybenzoic acid component, 4,4'-dihydroxybiphenyl component, and an isophthalic acid component and/or a terephthalic acid component, and a liquid-crystal polyester prepared by copolymerizing a p-hydroxybenzoic acid component, a 4,4'-dihydroxybiphenyl component, an isophthalic acid component, a terephthalic acid component, and a hydroquinone component.

For copolymerization to prepare the liquid-crystal polyester used in the twisted cord of liquid-crystal polyester multifilaments according to the present invention, a monomer other than the above-described monomers can be further used as long as the liquid crystallinity is not impaired, and examples of the monomer include aliphatic dicarboxylic acids such as adipic acid, azelaic acid, sebacic acid, and dodecanedioic acid, alicyclic dicarboxylic acids such as 1,4-cyclohexanedicarboxylic acid, polyethers such as polyethylene glycol, polysiloxanes, aromatic iminocarboxylic acids, aromatic diimines, and aromatic hydroxyimines.

In the present invention, the liquid-crystal polyester particularly preferably includes structural units (I), (II), (III), (IV), and (V) represented by the chemical formula described below. In the present invention, the term "structural unit" refers to a unit that can be included in a repeating structure in the main chain of a polymer.

[Chem. 1]

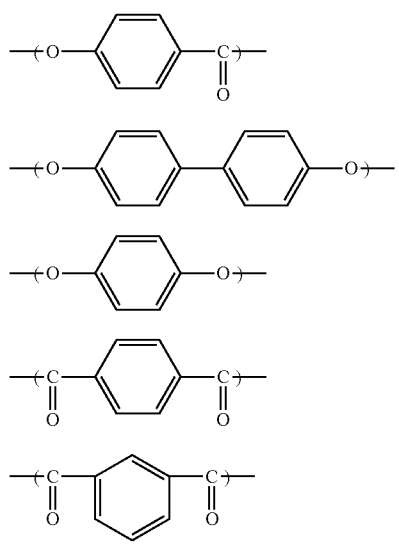

This combination ensures that the molecular chain has adequate crystallinity and non-linearity, that is, a melting point at which melt spinning can be performed. As a result, the polymer has a good yarn producing property at a spinning temperature set between the melting point of the polymer and the thermal decomposition temperature, a fiber that is relatively uniform in the longitudinal direction can be obtained, and the strength and the elastic modulus of the fiber can be enhanced because the polymer has the adequate crystallinity.

In the present invention, it is preferable to combine components having a structural unit such as (II) or (III) that is not bulky and includes a diol having high linearity. By combining these components, the molecular chain in the fiber has an ordered and little disordered structure, the crystallinity is not excessively increased, and the interaction in the direction perpendicular to the fiber axis can be maintained. As a result, in addition to the high strength and the high elastic modulus, excellent wear resistance can be obtained.

The proportion of the structural unit (I) is preferably 40 to 85 mol %, more preferably 65 to 80 mol %, and still more preferably 68 to 75 mol % based on the total of the structural units (I), (II), and (III). Because the proportion is in such a range, the crystallinity can be adjusted to an appropriate range, high strength and high elastic modulus can be obtained, and the melting point is in the range in which melt spinning can be performed.

The proportion of the structural unit (II) is preferably 60 to 90 mol %, more preferably 60 to 80 mol %, and still more preferably 65 to 75 mol % based on the total of the structural units (II) and (III). Because the proportion is in such a range, the crystallinity is not excessively increased, and the interaction in the direction perpendicular to the fiber axis can be maintained, so that the wear resistance can be enhanced.

The proportion of the structural unit (IV) is preferably 40 to 95 mol %, more preferably 50 to 90 mol %, and still more preferably 60 to 85 mol % based on the total of the structural units (IV) and (V). Because the proportion is in such a range, the melting point of the polymer is in an appropriate range, the polymer has a good yarn producing property at a spinning temperature set between the melting point of the polymer and the thermal decomposition temperature, and a fiber that has a small single fiber fineness and is relatively uniform in the longitudinal direction can be obtained.

It is preferable that the total of the structural units (II) and (III) and the total of the structural units (IV) and (V) be substantially equimolar. The term "substantially equimolar" as used herein means to be equimolar in the amount of the dioxy unit and the dicarbonyl unit that are included in the main chain, and the terminal structural units are not necessarily required to be equimolar in some cases that, for example, one terminal structural unit is unevenly distributed.

The particularly preferable range of each structural unit of the liquid-crystal polyester used in the twisted cord of liquid-crystal polyester multifilaments according to the present invention is as described below. The preferable range of each structural unit is based on 100 mol % of the total of the structural units (I), (II), (III), (IV), and (V).

Structural unit (I): 45 to 65 mol %
Structural unit (II): 12 to 18 mol %
Structural unit (III): 3 to 10 mol %
Structural unit (IV): 5 to 20 mol %
Structural unit (V): 2 to 15 mol %

By adjusting the composition so as to satisfy the above-described conditions within this range, the liquid-crystal polyester fiber used in the twisted cord of liquid-crystal polyester multifilaments according to the present invention can be suitably obtained.

The liquid-crystal polyester used in the twisted cord of liquid-crystal polyester multifilaments according to the present invention preferably has a weight average molecular weight (hereinafter Mw) of 30,000 or more, and more preferably 50,000 or more in terms of polystyrene. Because the Mw is 30,000 or more, the liquid-crystal polyester can have an appropriate viscosity at the spinning temperature and an enhanced yarn producing property, and the higher the Mw is, the higher the strength, the elongation, and the elastic modulus of the obtained fiber are. From the viewpoint of imparting excellent fluidity, the Mw is preferably less than 250,000, and more preferably less than 150,000. The Mw referred to in the present invention is a value determined by the method described in Examples.

The Liquid-crystal polyester used in the twisted cord of liquid-crystal polyester multifilaments according to the present invention preferably has a melting point in the range of 200 to 380° C., more preferably 250 to 350° C., and still more preferably 290 to 340° C. from the viewpoint of ease of melt spinning and heat resistance. The melting point referred to in the present invention is a value determined by the method described in Examples.

Furthermore, to the liquid-crystal polyester used in the twisted cord of liquid-crystal polyester multifilaments according to the present invention, another polymer can be added and used in combination as long as an effect of the present invention is not impaired. The phrase "another polymer can be added and used in combination" means that with one component or a plurality of components, another polymer is partially mixed and used, or entirely used in the case of mixing polymers or composite spinning of two or more components. As another polymer, for example, a vinyl polymer such as a polyester, a polyolefin, or polystyrene, or a polymer such as polycarbonate, a polyamide, a polyimide, polyphenylene sulfide, polyphenylene oxide, polysulfone, an aromatic polyketone, an aliphatic polyketone, semi-aromatic polyesteramide, polyether ether ketone, or a fluororesin may be added, and preferable examples include polyphenylene sulfide, polyether ether ketone, nylon 6, nylon 66, nylon 46, nylon 6T, nylon 9T, polyethylene terephthalate, polypropylene terephthalate, polybutylene terephthalate, polyethylene naphthalate, polycyclohexanedimethanol terephthalate, and polyester 99M. When another polymer is added and used in combination, the melting point is preferably within the melting point of the liquid-crystal polyester±30° C. so that the yarn producing property is not impaired, and in order to improve the strength and the elastic modulus of the obtained fiber, the amount of another polymer added and used in combination is preferably 50% by weight or less, and more preferably 5% by weight or less based on the amount of the liquid-crystal polyester, and it is most preferable that substantially no other polymer be added and used in combination.

The liquid-crystal polyester used in the twisted cord of liquid-crystal polyester multifilaments according to the present invention may contain a small amount of an inorganic substance such as a metal oxide, kaolin, or silica, or an additive such as a colorant, a matting agent, a flame retardant, an antioxidant, an ultraviolet absorber, an infrared absorber, a crystal nucleating agent, a fluorescent whitening agent, a hydrolysis inhibitor, a terminal group sealing agent, or a compatibilizer as long as an effect of the present invention is not impaired.

In the melt spinning of the liquid-crystal polyester multifilament used in the twisted cord of liquid-crystal polyester multifilaments according to the present invention, an ordinary method can be used as a basic melt extrusion method, and in order to eliminate the ordered structure formed during polymerization, it is preferable to use an extruder that extrudes a material. The extruded polymer is weighed with a known weighing device such as a gear pump through a pipe, passed through a filter for removing a foreign material, and then guided to a spinneret. At this time, the temperature from the polymer pipe to the spinneret (spinning temperature) is preferably equal to or more than the melting point of the liquid-crystal polyester and equal to or less than the thermal decomposition temperature, more preferably equal to or more than the {melting point+10° C.} of the liquid-crystal polyester and 400° C. or less, and still more preferably equal to or more than the {melting point+20° C.} of the liquid-crystal polyester and 370° C. or less. The temperatures from the polymer pipe to the spinneret can also be adjusted independently. In this case, the discharge is stabilized by setting the temperature of the portion near the spinneret higher than the temperature of the upstream side.

Furthermore, in the melt spinning of the liquid-crystal polyester multifilament, the discharge and the thinning behavior of each spinneret hole is required to be stabilized because multiple spinneret holes are usually drilled in one spinneret for the purpose of reduction in the energy cost and improvement in the productivity.

In order to achieve the stabilization, the hole diameter D of the spinneret hole is preferably small and the land length L (the length of the straight pipe portion of the spinneret hole) is preferably large. However, from the viewpoint of effectively preventing clogging of the holes, the hole diameter D is preferably 0.03 mm or more and 1.00 mm or less, more preferably 0.05 mm or more and 0.80 mm or less, and still more preferably 0.08 mm or more and 0.60 mm or less. From the viewpoint of effectively preventing increase in the pressure loss, L/D defined by the quotient of the land length L divided by the hole diameter D is preferably 0.5 or more and 3.0 or less, more preferably 0.8 or more and 2.5 or less, and still more preferably 1.0 or more and 2.0 or less.

In order to improve the productivity of the liquid-crystal polyester multifilament, the number of holes in a spinneret is preferably 10 or more and 600 or less, more preferably 10 or more and 400 or less, and still more preferably 10 or more and 300 or less. In order not to increase the pressure loss, the introduction hole located immediately above the spinneret hole is preferably a straight hole having a diameter that is 5 times or more of the spinneret hole diameter D. In order to suppress abnormal stagnation, it is preferable to taper the connection part between the introduction hole and the spinneret hole, and the length of the tapered part is preferably twice or less of the land length L in order not to increase the pressure loss and in order to stabilize the streamline.

The polymer discharged from the spinneret hole passes through a heat-retaining region and a cooling region to be solidified into a filament, and then taken up by a roller (godet roller) rotating at a constant speed. If the heat-retaining region is too long, the yarn producing property is deteriorated. Therefore, the length of the heat-retaining region is preferably 400 mm or less, more preferably 300 mm or less, and still more preferably 200 mm or less from the spinneret face. The ambient temperature in the heat-retaining region can also be raised using heating means, and the temperature range is preferably 100° C. or more and 500° C. or less, and more preferably 200° C. or more and 400° C. or less. For cooling, an inert gas, air, steam, or the like can be used, and a parallel or annular air flow is preferably used from the viewpoint of reducing the environmental load.

The take-up speed is preferably 50 m/min or more, more preferably 300 m/min or more, and still more preferably 500 m/min or more in order to improve the productivity. Because the liquid-crystal polyester used in the twisted cord of liquid-crystal polyester multifilaments according to the present invention has suitable spinnability at the spinning temperature, the take-up speed can be high. The upper limit is not particularly limited, and in the liquid-crystal polyester used in the twisted cord of liquid-crystal polyester multifilaments according to embodiments of the present invention, the take-up speed is about 3,000 m/min from the viewpoint of spinnability.

The spinning draft defined by the quotient of the take-up speed divided by the discharge linear velocity is preferably 1 or more and 500 or less, more preferably 5 or more and 200 or less, and still more preferably 12 or more and 100 or less. Because the liquid-crystal polyester used in the twisted cord of liquid-crystal polyester multifilaments according to the present invention has suitable spinnability, the draft can be high, and the fact is advantageous for improving the productivity. The discharge linear velocity (m/min) used in the calculation of the spinning draft is the value defined by the quotient of the discharge rate per single hole (m³/min) divided by the sectional area of the single hole (m²), and the spinning draft that is obtained by dividing the take-up speed (m/min) by the discharge linear velocity is a dimensionless number.

In the present invention, from the viewpoint of improving the yarn producing property and the productivity, the polymer discharge rate per spinning pack is preferably set to 10 to 2,000 g/min, more preferably 20 to 1,000 g/min, and still more preferably 30 to 500 g/min in order to obtain the above-described spinning draft. By spinning at a high polymer discharge rate of 10 to 2,000 g/min, the productivity of the liquid-crystal polyester multifilament is improved.

The winding can be performed using an ordinary winder to form a package having a shape of cheese, pirn, corn, or the like, and a package having a shape of cheese is preferable in which the winding amount can be set high.

In the melt spinning of the liquid-crystal polyester multifilament used in the twisted cord of liquid-crystal polyester multifilaments according to embodiments of the present invention, the multifilaments are generally bundled by applying a spinning oil agent to the discharged yarn with an oiling roller or the like, drawn with a roller or the like, and then wound with a winder without being extended. By bundling the multifilaments as described above, the winding property is improved, and a package can be obtained in which no deformation of the winding occurs.

After the melt spinning to form a filament, the liquid-crystal polyester multifilament is preferably solid-phase polymerized.

In the case of solid-phase polymerization in the form of a package, fusion easily occurs, therefore, in order to prevent the fusion, it is preferable to form a package having a winding density of 0.30 g/cm$^3$ or more on a bobbin and to subject the package to solid-phase polymerization. Here, the winding density is a value calculated by Wf/Vf (g/cm$^3$) from the package occupying volume Vf (cm$^3$), that is determined from the outer dimension of the package and the dimension of the bobbin being a core material, and the fiber weight Wf (g). If the winding density is too small, not only the contact area between the fibers is increased to increase the fusion, but also the deformation of the winding occurs in the package because of the insufficient tension in the package. Therefore, the winding density is preferably 0.30 g/cm$^3$ or more, more preferably 0.40 g/cm$^3$ or more, and still more preferably 0.50 g/cm$^3$ or more. The upper limit is not particularly limited, and if the winding density is too large, the adhesion between the fibers in the inner layer of the package is increased to increase the fusion at the contact, therefore, the winding density is preferably 1.50 g/cm$^3$ or less. From the viewpoint of reducing fusion and preventing deformation of the winding, the winding density is more preferably 0.30 to 1.00 g/cm$^3$.

A package having such a winding density has a good process passability, and the process can be simplified. For example, the liquid-crystal polyester can be subjected to melt spinning and then directly wound to form a package having the above-described winding density, so that the process passability can be improved. Furthermore, at the time of, for example, adjusting the yarn weight during the solid-phase polymerization, it is possible to subject the package once wound by melt spinning to rewinding to form a package having the above-described winding density. For adjusting the package shape and controlling the winding density, it is also effective to wind the package whose surface is in a non-contact state without using a contact roll or the like that is usually used, and to wind the melt-spun raw yarn directly with a speed-controlled winder without through a speed control roll. In these cases, the winding speed is preferably 3,000 m/min or less, and particularly preferably 2,000 m/min or less in order to adjust the package shape. As for the lower limit, the winding speed is preferably 50 m/min or more from the viewpoint of productivity.

The bobbin used for forming the package may be any one having a cylindrical shape. During the winding to obtain a package, the bobbin is attached to a winder and rotated to wind the fiber to form a package. In solid-phase polymerization, the package can be processed integrally with the bobbin, or only the bobbin can be removed from the package to process the package. In the case of processing the package wound around the bobbin, the bobbin needs to withstand the solid-phase polymerization temperature, and preferably includes a metal such as aluminum, brass, iron, or stainless steel. In this case, the bobbin preferably has a large number of holes because, with such a bobbin, the solid-phase polymerization can be efficiently performed. In the case that the bobbin is removed from the package for processing, it is preferable to provide the outer surface of the bobbin with a cover. In both cases, it is preferable that a cushion material be wound on the outer surface of the bobbin, and the liquid-crystal polyester multifilament be wound on the cushion material. The material of the cushion material is preferably felt including an organic fiber such as an aramid fiber or a metal fiber, and the thickness of the material is preferably 0.1 mm or more and 20 mm or less. The above-described cover can be replaced by the cushion material.

The package may have any fiber weight as long as the winding density is within the range according to the present invention, and in consideration of productivity, the fiber weight is preferably in the range of 0.01 kg or more and 11 kg or less. The yarn length is preferably in the range of 10,000 m or more and 2,000,000 m or less.

It is a preferred embodiment to adhere an oil agent to the surface of the filament in order to prevent fusion during the solid-phase polymerization. The component may be adhered between the melt spinning and the winding, and in order to improve the adhesion efficiency, the component is preferably adhered during the rewinding, or adhered in a small amount at the time of melt spinning and further adhered at the time of rewinding.

The method of adhering the oil agent may be guide oiling, and in order to adhere the oil agent uniformly to the fiber, a metal or ceramic kiss roll (oiling roll) is preferably used for the adhesion.

The component of the oil agent is required to have high heat resistance in order not to be volatilized by high temperature heat treatment in the solid-phase polymerization, and ordinary inorganic particles, fluorine-based compounds, siloxane-based compounds (dimethylpolysiloxane, diphenylpolysiloxane, methylphenylpolysiloxane, and the like), and mixtures thereof are preferable. Examples of the ordinary inorganic particles in the present invention include minerals, metal hydroxides such as magnesium hydroxide, metal oxides such as silica and alumina, carbonates such as calcium carbonate and barium carbonate, sulfates such as calcium sulfate and barium sulfate, and carbon black.

These components may be solid-adhered, or the oil agent may be directly applied. In order to apply the component uniformly while the adhesion amount is optimized, emulsion application is preferable, and the emulsion is particularly preferably a water emulsion from the viewpoint of safety. Therefore, it is desirable that the component be water-soluble or easily form a water emulsion. A mixture oil agent is particularly preferable in which a water emulsion of a siloxane-based compound is mainly used and silica or a silicate is added to the emulsion because such a mixture oil agent is inert under the solid-phase polymerization condition and effective for slipperiness in addition to for preventing fusion in the solid-phase polymerization. In the case that a silicate is used, a phyllosilicate having a layered structure is particularly preferable. Examples of the phyllosilicate include kaolinite, halloysite, serpentine, garnierite, smectites, pyrophyllite, talc, and mica, and among these phyllosilicates, talc and mica are most preferably used in consideration of availability.

The adhesion amount of the oil agent to the fiber is preferably large in order to suppress fusion, and is preferably 0.5% by weight or more, and more preferably 1.0% by weight or more based on 100% by weight of the entire fiber. Meanwhile, if the adhesion amount is too large, the fiber is sticky to deteriorate the handling property and deteriorate the process passability in the subsequent step, therefore, the adhesion amount is preferably 10.0% by weight or less, more preferably 8.0% by weight or less, and particularly preferably 6.0% by weight or less. The adhesion amount of the oil agent to the fiber refers to the value determined by the method described in Examples.

The solid-phase polymerization can be performed in an atmosphere of an inert gas such as nitrogen, in an atmosphere of an oxygen-containing active gas such as air, or under reduced pressure, and is preferably performed in a nitrogen atmosphere in order to simplify the equipment and prevent oxidation of the fiber or the adhesion material. At this time, the solid-phase polymerization is preferably performed in an atmosphere of a low-humidity gas having a dew point of −40° C. or less.

The solid-phase polymerization temperature is preferably set using, as an index, the endothermic peak temperature ($T_{m1}$) of the liquid-crystal polyester multifilament to be subjected to the solid-phase polymerization. The endothermic peak temperature ($T_{m1}$) is determined using the melting point measurement method described in Example (1). For example, with respect to the endothermic peak temperature ($T_{m1}$) of the liquid-crystal polyester multifilament to be subjected to the solid-phase polymerization, the maximum temperature reached is preferably {endothermic peak temperature ($T_{m1}$)-80° C.} or more of the liquid-crystal polyester multifilament. By setting the solid-phase polymerization temperature to a high temperature in the vicinity of such an endothermic peak temperature ($T_{m1}$), the solid-phase polymerization rapidly proceeds, and the strength of the fiber can be improved. Furthermore, the maximum temperature reached is preferably less than $T_{m1}$ in order to prevent fusion. Because the melting point of the liquid-crystal polyester multifilament is raised as the solid-phase polymerization proceeds, the solid-phase polymerization temperature can be raised to about {endothermic peak temperature ($T_{m1}$)+100° C.} of the liquid-crystal polyester multifilament to be subjected to the solid-phase polymerization in accordance with the progress state of the solid-phase polymerization. It is more preferable to raise the solid-phase polymerization temperature stepwise or continuously with respect to time because fusion can be prevented and the time efficiency of the solid-phase polymerization can be enhanced.

The solid-phase polymerization time is preferably 5 hours or more, and more preferably 10 hours or more at the maximum temperature reached in order to sufficiently increase the strength, the elastic modulus, and the melting point of the fiber. The upper limit is not particularly limited, and a solid-phase polymerization time of about 100 hours is enough because the effect of increasing the strength, the elastic modulus, and the melting point is saturated with the lapse of time. In order to enhance the productivity, the solid-phase polymerization time is preferably short, and there is no problem if the solid-phase polymerization time is about 50 hours.

The package after the solid-phase polymerization is preferably subjected to rewinding again to increase the winding density in order to enhance the transportation efficiency. When unwound from the solid-phase polymerization package, the multifilament is preferably unwound by so-called side unwinding in which the solid-phase polymerization package is rotated, and during the rotation, the yarn is unwound in the direction perpendicular to the axis of the rotation (fiber circulation direction) in order to prevent deformation of the solid-phase polymerization package due to the unwinding and to suppress fibrillation during tearing slight fusion. The solid-phase polymerization package is preferably rotated not by free rotation but by positive driving from the viewpoint of reducing the tension of yarn separation from the package and further suppressing fibrillation.

The method for obtaining a twisted cord of liquid-crystal polyester multifilaments having a coefficient of variation in cord diameters in a longitudinal direction, X, of less than 30% as in the present invention is not limited, and examples of the method include a method in which the liquid-crystal polyester multifilament used in the twisted cord of liquid-crystal polyester multifilaments according to embodiments of the present invention is bent in a plurality of directions when unwound from the package in which the solid-phase polymerization of the liquid-crystal polyester multifilament is completed. The term "direction" refers to the direction shown in the range of 0 to 360° in the plane perpendicular to the longitudinal direction of the unwound multifilament, and the term "azimuth" is defined as the angle that the direction in which the multifilament is first bent forms with the direction in which the multifilament is bent thereafter (that is, the azimuth in the first bending direction is 0°).

That is, in embodiments of the present invention, as a result of the investigation and the intensive study of the factor that affects the followability (deformation property) of each single fiber to twisting when one or a plurality of liquid-crystal polyester multifilaments used in the twisted cord of liquid-crystal polyester multifilaments are twisted, it has been found that the multifilament yarn can be made flexible by bending, in a plurality of directions, the liquid-crystal polyester multifilament unwound from the package of the liquid-crystal polyester multifilament in which the solid-phase polymerization is completed, and that the uniformity of the cord diameter in the longitudinal direction in the form of a twisted cord is improved remarkably compared with that in the conventional technique.

In order to enhance the flexibility of the liquid-crystal polyester multifilament, the liquid-crystal polyester multifilament is preferably bent in 4 or more directions, and more preferably 8 or more directions. The upper limit is not particularly limited, and the liquid-crystal polyester multifilament is preferably bent in 36 or less directions from the viewpoint of improving work efficiency at the time of threading. In the present invention, the liquid-crystal polyester multifilament is preferably bent in 4 to 18 directions from the viewpoints of workability of threading and simplification of the equipment.

The azimuth when the liquid-crystal polyester multifilament is bent in a plurality of directions is preferably an angle obtained by equally dividing 360° by the number of times of the bending in order to make each single fiber in the multifilament uniformly flexible. For example, the azimuth when the liquid-crystal polyester multifilament is bent in 8 directions is an angle obtained by dividing 0 to 360° into 8 equal divisions in a plane perpendicular to the longitudinal direction of the multifilament after releasing, that is, 0°, 45°, 90°, 135°, 180°, 225°, 270°, and 315°. The liquid-crystal polyester multifilament may be bent in any order of the above-described angles except the azimuth of 0° (first bending).

The distance between the guides (the distance from one bend to the next bend) is preferably 50 cm or more in order to suppress shaking of the yarn after the bending of the multifilament, and to suppress removal of the yarn from the guide and catching of the yarn on the guide, and preferably 100 cm or less in order to make the equipment compact.

As a method of bending the multifilament, bending with a thread guide such as a bar guide, a loop guide, an eyelet guide, a slit guide, a hook guide, a snail guide, a roller guide, a bearing roller guide, or the like is preferable, and among the thread guides, the roller guide and the bearing roller guide are more preferably used in order to reduce abrasion of the multifilament.

The bending angle after passing through the guide is preferably 30° or more, and more preferably 60° or more in order to effectively bend the multifilament and enhance the flexibility of the yarn. The upper limit is not particularly limited, and the bending angle after passing through the guide is preferably 90° or less from the viewpoint of threading workability. The term "bending angle" refers to an angle formed by an extension line extending in the longitudinal direction of the running yarn before passing through the guide and a longitudinal direction of the running yarn after passing through the guide and bending.

After bending the multifilament, the liquid-crystal polyester multifilament package is formed again. In the present invention, the package can have a form of a pan, a drum, a cone, or the like, and from the viewpoint of productivity, a drum winding package is preferable that can secure a large winding amount.

In order to enhance the process passability in the case of forming a high-order processed product, it is required to impart the bundling property to the liquid-crystal polyester multifilament used in the twisted cord of liquid-crystal polyester multifilaments according to embodiments of the present invention, and in preferable aspects, various finishing oil agents are applied depending on an object.

In order to obtain a twisted cord of liquid-crystal polyester multifilaments having a coefficient of variation in cord diameters in a longitudinal direction, X, of less than 30% as in embodiments of the present invention, the tension during twisting one or a plurality of the liquid-crystal polyester multifilaments is also an important factor. Specifically, by controlling the running tension of the liquid-crystal polyester multifilament during twisting to 0.01 to 1.0 cN/dtex and controlling the coefficient of variation in tension to less than 30%, the difference in yarn length of each single fiber of the liquid-crystal polyester multifilament can be reduced, and a twisted cord of liquid-crystal polyester multifilaments having a uniform cord diameter in the longitudinal direction according to the present invention can be suitably obtained. The tension conditions during twisting are more preferably a running tension of 0.50 cN/dtex or less and a coefficient of variation in tension of less than 15%. The coefficient of variation in tension refers to the value determined by the method described in Examples.

The twisted cord of liquid-crystal polyester multifilaments according to embodiments of the present invention has a coefficient of variation in cord diameters in a longitudinal direction, X, that is calculated from (Formula 1), of less than 30%, preferably less than 25%, more preferably less than 20%, and still more preferably less than 10%.

Coefficient of variation in cord diameters, $X$ (%)={standard deviation of cord diameters in a longitudinal direction, $\sigma$ (mm)÷average cord diameter, $D$ (mm)}×100     (Formula 1)

The twisted cord of liquid-crystal polyester multifilaments having a uniform cord diameter in the longitudinal direction in which the coefficient of variation in cord diameters, X, of less than 30% gives various high-order processed products capable of retaining desired product shapes, and is suitable for use in general industrial material applications such as high-strength ropes, slings, and nets. If the coefficient of variation in cord diameters, X, is 30% or more, the cord diameter is not uniform in the longitudinal direction, so that the various high-order processed products formed with the twisted cord cannot retain desired product shapes. The coefficient of variation in cord diameters, X, refers to the value determined by the method described in Examples.

The twisted cord of liquid-crystal polyester multifilaments according to the present invention preferably has a strength of 12.0 cN/dtex or more, more preferably 15.0 cN/dtex or more, and still more preferably 17.0 cN/dtex or more. The twisted cord having a strength of 12.0 cN/dtex or more is suitable for use in industrial material applications in which high strength and light weight are required. The upper limit of the strength is not particularly limited, and the upper limit that can be reached in the present invention is about 30.0 cN/dtex. The strength of the twisted cord described in the present invention refers to the value determined by the method described in Examples.

In producing the twisted cord of liquid-crystal polyester multifilaments according to the present invention, the configuration of the twisted cord is not limited at all. For example, one or a plurality of liquid-crystal polyester multifilaments can be single-twisted to form a twisted cord, or two or more twisted cords once single-twisted (for example, S-twisted) can be twisted again in the same twist direction as the first twist direction (for example, S twist direction) or in the twist direction opposite from the first twist direction (for example, Z twist direction) to form a twisted cord. There is no problem in twisting the multifilaments three times or more in the same manner. In embodiments of the present invention, by using the liquid-crystal polyester multifilament having yarn flexibility, it is possible to stably produce twisted cords having various twisted yarn configurations and obtain a twisted cord having a uniform cord diameter in the longitudinal direction.

The liquid-crystal polyester multifilament used in the twisted cord of liquid-crystal polyester multifilaments according to the present invention preferably has a single fiber fineness of 1 to 50 dtex. The single fiber fineness is more preferably 1 to 30 dtex, and still more preferably 1 to 20 dtex. By setting the single fiber fineness to 1 to 50 dtex, the single fiber can be uniformly cooled to the inside after the discharge, the yarn producing property is stabilized, a liquid-crystal polyester multifilament having good fluff quality is easily obtained, and in addition, the surface area of the fiber exposed to the outside air during heat treatment is increased to enhance the strength and the elastic modulus advantageously. The liquid-crystal polyester multifilament yarn having a single fiber fineness of 1 to 50 dtex has lower rigidity than yarns having a single fiber fineness of 50 dtex or more, therefore, such a liquid-crystal polyester multifilament yarn has excellent high-order process passability, and when the yarn is used in a woven fabric and the like, the yarn filling rate is high, and it is possible to increase the density and improve the storability. In the present invention, the single fiber fineness (dtex) is defined as the quotient of the total fineness divided by the number of single fibers.

The number of single fibers (filament number) of the liquid-crystal polyester multifilament used in the twisted cord of liquid-crystal polyester multifilaments according to the present invention is preferably 10 to 600, more preferably 10 to 400, and still more preferably 10 to 300. By setting the number of single fibers to 10 to 600, the productivity of the multifilament can be improved, and the surface area of the fiber exposed to the outside air during heat treatment is increased, so that the solid-phase polymerization reaction is promoted to obtain a liquid-crystal polyester multifilament having reduced variations in the strength and the elastic modulus and having a uniform physical property. Note that there is no problem in forming a liquid-crystal polyester multifilament having 10 to 600 single fibers by separation or doubling of the sample prepared by spinning. The number of single fibers refers to the value determined by the method described in Examples.

The total fineness T of the liquid-crystal polyester multifilament used in the twisted cord of liquid-crystal polyester multifilaments according to the present invention is preferably 50 to 3,000 dtex, more preferably 100 to 2,500 dtex, and still more preferably 200 to 2,000 dtex. By setting the total fineness T to 50 to 3,000 dtex, the multifilament has high process passability, and is suitable for use in industrial material applications in which the amount of raw yarn used is extremely large. Note that there is no problem in forming a liquid-crystal polyester multifilament in which the total fineness is 50 to 3,000 dtex by separation or doubling of the sample prepared by spinning. The total fineness refers to the value determined by the method described in Examples.

The liquid-crystal polyester multifilament used in the twisted cord of liquid-crystal polyester multifilaments according to the present invention preferably has a strength of 15.0 cN/dtex or more, more preferably 17.0 cN/dtex or more, and still more preferably 19.0 cN/dtex or more after the solid-phase polymerization. The multifilament having a strength of 15.0 cN/dtex or more is suitable for use in industrial material applications in which high strength and light weight are required. The upper limit of the strength is not particularly limited, and the upper limit that can be reached in the present invention is about 30.0 cN/dtex. The strength described in the present invention refers to the breaking strength in the strength/elongation/elastic modulus measurement described in Examples.

The liquid-crystal polyester multifilament used in the twisted cord of liquid-crystal polyester multifilaments according to the present invention preferably has an elongation of 5.0% or less, more preferably 4.5% or less, and still more preferably 4.0% or less after the solid-phase polymerization. Because the elongation is 5.0% or less, the multifilament is difficult to elongate when stress is applied from the outside and is suitable for use in heavy object lifting without a dimensional change. The lower limit of the elongation is not particularly limited, and the lower limit that can be reached in the present invention is about 1.0%. The elongation described in the present invention refers to the breaking elongation in the strength/elongation/elastic modulus measurement described in Examples.

The liquid-crystal polyester multifilament used in the twisted cord of liquid-crystal polyester multifilaments according to the present invention preferably has an elastic modulus of 300 cN/dtex or more, more preferably 500 cN/dtex or more, and still more preferably 700 cN/dtex or more after the solid-phase polymerization. The multifilament having an elastic modulus of 300 cN/dtex or more is, because of its small dimensional change by stress, suitable for use in industrial material applications. The upper limit of the elastic modulus is not particularly limited, and the upper limit that can be reached in the present invention is an elastic modulus of about 1,000 cN/dtex. The elastic modulus described in the present invention refers to the elastic modulus in the strength/elongation/elastic modulus measurement described in Examples.

The liquid-crystal polyester multifilament used in the twisted cord of liquid-crystal polyester multifilaments according to the present invention preferably has a yarn flexibility index S of 8.0 or less, more preferably 5.0 or less, and still more preferably 4.0 or less. If the yarn flexibility index S is more than 8.0, the yarn is disturbed at the time of unwinding when the multifilament is twisted, quality variation due to tension variation is caused, the yarn is often caught on the package or the yarn guide, and stable unwinding is difficult. By setting the yarn flexibility index S to 8.0 or less, the unwinding property at the time of unwinding the package is significantly improved, and the process passability at the time of high-order processing can be dramatically improved. In order to improve the unwinding property at the time of unwinding the package, it is important to improve the flexibility, and the yarn flexibility index S is effective as an index of the flexibility. The lower limit of the yarn flexibility index S that can be reached in the present invention is about 0.1. The yarn flexibility index S of the liquid-crystal polyester multifilament refers to the value determined by the method described in Examples.

When the liquid-crystal polyester multifilament used in the twisted cord of liquid-crystal polyester multifilaments according to embodiments of the present invention is twisted (twist coefficient: 80), the raw yarn strength retention rate is preferably 70 to 99%, more preferably 75 to 99%, still more preferably 80 to 99%, and particularly preferably 85 to 99%. By setting the raw yarn strength retention rate to 70 to 99%, the high-order processed product formed with the twisted cord can sufficiently exhibit the raw yarn strength (the original yarn strength utilization rate can be increased), and the product strength is improved. If the raw yarn strength retention rate is less than 70%, the high-order processed product formed with the twisted cord cannot sufficiently exhibit the raw yarn strength (because the original yarn strength utilization rate is low), so that sufficient product strength cannot be obtained. The raw yarn strength retention rate refers to the value determined by the method described in Examples.

The liquid-crystal polyester multifilament used in the twisted cord of liquid-crystal polyester multifilaments according to embodiments of the present invention has a knot strength and a loop strength of 7.0 to 12.0 cN/dtex, preferably 7.5 to 12.0 cN/dtex, and more preferably 8.0 to 12.0 cN/dtex. By setting the knot strength and the loop strength to 7.0 to 12.0 cN/dtex, the high-order processed product formed with the twisted cord can sufficiently exhibit the raw yarn strength, and the product strength is improved. If even one of the knot strength or the loop strength is less than 7.0 cN/dtex, sufficient product strength cannot be obtained because the high-order processed product formed with the twisted cord cannot sufficiently exhibit the raw yarn strength. The upper limit of the knot strength and the loop strength that can be reached in the present invention is about 12.0 cN/dtex. The knot strength and the loop strength refer to the value determined by the method described in Examples.

Because the twisted cord of liquid-crystal polyester multifilaments according to embodiments of the present invention obtained in the above-described manner has a coefficient of variation in cord diameters in a longitudinal direction, X, of less than 30% and has a uniform cord diameter in the longitudinal direction, the twisted cord gives various high-order processed products capable of retaining desired product shapes, and is suitable for use in general industrial material applications such as high-strength ropes, slings, and nets. Furthermore, the liquid-crystal polyester multifilament used in the twisted cord of liquid-crystal polyester multifilaments according to embodiments of the present invention has yarn flexibility, so that when one or a plurality of liquid-crystal polyester multifilaments are twisted, the followability (deformation property) of each single fiber to the twisting is very high, and each single fiber is uniformly twisted in the twisted cord. As a result, the difference in yarn length is remarkably improved between the single fibers, and the stress applied from the outside is uniformly dispersed over all the single fibers included in the twisted cord to remarkably improve the strength of the twisted cord.

As described above, the twisted cord of liquid-crystal polyester multifilaments having high strength, high elasticity, heat resistance, dimensional stability, chemical resistance, and low hygroscopicity is suitable for use in general industrial material applications. Examples of the general industrial material applications include ropes, slings, fishing nets, nets, braids, meshes, woven fabrics, knitted fabrics, fabrics, sheet-shaped materials, belts, tension members, civil engineering/construction materials, sports materials, protective materials, rubber reinforcement materials, various reinforcing cords, resin-reinforcing fiber materials, electric materials, and acoustic materials. The twisted cord of liquid-crystal polyester multifilaments according to embodiments of the present invention is particularly suitable for use in applications in which a step of twisting a raw yarn is included in a high-order processing (such as ropes, slings, and nets) among the above-described applications.

EXAMPLES

Next, the present invention will be described in more detail with reference to Examples, but the present invention is not limited thereto. The definitions of the physical properties used in the present description and Examples, the method for measuring each physical property, and the method for calculating each physical property are shown below.

(1) Melting Point

In the differential calorimetric measurement performed with a differential scanning calorimeter (DSC2920 manufactured by TA Instruments), the endothermic peak temperature ($T_{m1}$) was observed in the measurement under the condition of raising the temperature from 50° C. at 20° C./min, then the temperature was kept at a temperature of approximately $T_{m1}$+20° C. for 5 minutes and then lowered to 50° C. at a cooling rate of 20° C./min, and the endothermic peak temperature ($T_{m2}$) was observed as a melting point in the measurement under the condition of raising the temperature at 20° C./min again. The operation was performed twice in the same manner, and the average of the two values obtained was regarded as the melting point of the liquid-crystal polyester $T_{m2}$ (° C.).

(2) Weight Average Molecular Weight in Terms of Polystyrene (Mw)

Using a mixed solvent of pentafluorophenol/chloroform=35/65 (weight ratio) as a solvent, the liquid-crystal polyester is dissolved in the mixed solvent while the solution is stirred at 120° C. for 20 minutes. At this time, the concentration of the liquid-crystal polyester is adjusted to 0.04% by weight, and the liquid-crystal polyester is used as a GPC measurement sample. The sample was measured under the following conditions using a GPC measuring device manufactured by Waters Corporation, and Mw was determined in terms of polystyrene.

Column: ShodexK-G (1)
ShodexK-806M (2)
ShodexK-802 (1)
Detector: differential refractive index detector RI (2414 type)
Temperature: 23±2° C.
Flow rate: 0.8 mL/min
Injection volume: 0.200 mL The operation was performed twice in the same manner, and the average of the two values obtained was regarded as the weight average molecular weight (Mw).

(3) Moisture Content

The moisture content was measured by a coulometric titration method using a Karl Fischer moisture meter (AQ-2100) manufactured by HIRANUMA SANGYO Co., Ltd. The average of three values obtained in trials was used.

(4) Oil Agent Concentration

The weight of the solution in which an oil agent was dispersed was represented by W0, the weight of the oil agent was represented by W1, and the product of the quotient of W1 divided by W0 and 100 was regarded as the oil agent concentration (% by weight).

(5) Oil Agent Adhesion Amount

A hank of 100 m of a fiber was taken up with a measuring machine, the weight was measured, and the hank was immersed in 100 ml of water and washed with an ultrasonic cleaner for 1 hour. The hank after the ultrasonic cleaning was dried at a temperature of 60° C. for 1 hour, the weight was measured, and the product of the quotient of the difference between the weight before the cleaning and the weight after the cleaning divided by the weight before the cleaning and 100 was regarded as the oil agent adhesion amount (% by weight).

(6) Coefficient of Variation in Cord Diameters, X, of Twisted Cord

The coefficient of variation in cord diameters in a longitudinal direction, X, of the twisted cord of liquid-crystal polyester multifilaments was calculated by (Formula 1) described below.

Coefficient of variation in cord diameters, $X$ (%)={standard deviation of cord diameters in a longitudinal direction, $\sigma$ (mm)÷average cord diameter, $D$ (mm)}×100   (Formula 1)

The average cord diameter, D, and the standard deviation of cord diameters, σ, in Formula 1 were measured by running the twisted cord of liquid-crystal polyester multifilaments at a speed of 1 m/min for 100 minutes (=100 m) and using a dimensional measuring instrument manufactured by KEYENCE CORPORATION (head part: model number TM-006, controller part: model number TM-3000, measurement cycle: 10 milliseconds).

(7) Strength of Twisted Cord

The strength of the twisted cord was measured under the constant-speed elongation condition shown in the JIS L 1013 (2010) 8.5.1 standard time test. The sample was measured using "TENSILON" RTM-1T manufactured by ORIENTEC CORPORATION at a gripping interval (measurement test length) of 250 mm and a tension rate of 50 ram/min. The stress at the time of breaking was regarded as the strength, and the value obtained by dividing the breaking stress of the twisted cord by the total fineness of the twisted cord was regarded as the strength of the twisted cord. When measured, the twisted cord was chucked so as not to be untwisted.

(8) Single Fiber Fineness

The value obtained by dividing the total fineness by the number of single fibers was regarded as the single fiber fineness (dtex).

(9) Number of Single Fibers

The number of single fibers was calculated by the method of JIS L 1013 (2010) 8.4.

(10) Total Fineness

In accordance with JIS L 1013 (2010) 8.3.1 A method, the fineness based on corrected mass was measured at a predetermined load of 0.045 cN/dtex and regarded as the total fineness T(dtex).

(11) Strength, Elongation, and Elastic Modulus

The strength, the elongation, and the elastic modulus were measured under the constant-speed elongation condition shown in the JIS L 1013 (2010) 8.5.1 standard time test. The sample was measured using "TENSILON" RTM-100 manufactured by ORIENTEC CORPORATION at a gripping interval (measurement test length) of 250 mm and a tension rate of 50 mm/min. The strength and the elongation at the time of breaking were regarded as the stress and the elongation, and the elastic modulus was calculated from the inclination at the 0.5% elongation point in the graph of the stress and the elongation in the tensile test.

(12) Flexing Resistance Value A

The flexing resistance was measured with reference to the constant-speed deflection condition shown in JIS K7171. First, in order to smooth the bend and the twist of the liquid-crystal polyester multifilament wound in a package, the liquid-crystal polyester multifilament was cut out into a length of 1000 mm, one end of the cut out multifilament was connected with a metal hook, the other end was connected with a weight having a weight of 30% of the breaking load, and the weight was hung in the air for 24 hours in an environment controlled at a temperature of 25° C. and a relative humidity of 40% to make the multifilament vertical and obtain a measurement sample. The obtained measurement sample was further cut out into a length of 40 mm to obtain a sample piece. Using "TENSILON" UTM-4-100 manufactured by Toyo Baldwin Co., Ltd., the obtained test piece was placed symmetrically on support stands installed at an interval of 5 mm, and a force was applied to the center of the span of the test piece between the supports with an indenter. With the support stands fixed, the indenter was lowered at a constant speed of 20 ram/min to apply a force to the test piece, and the maximum load was measured as the flexing resistance value A (cN). The support stands and the indenter had a diameter of 1.0 mm. The average of five values obtained in trials was used. In the case that the total fineness and the flexing resistance of the sample were small, the flexing resistance was measured in a state where, for example, multiple products having a small fineness were combined to form a thick product, and the yarn flexibility index S described below was calculated from the obtained flexing resistance value and the total fineness after the combination.

(13) Yarn Flexibility Index S

The yarn flexibility index S of the liquid-crystal polyester multifilament before twisting was defined using the flexing resistance value A (cN) of the liquid-crystal polyester multifilament and the total fineness T (dtex) of the liquid-crystal polyester multifilament by the following formula: yarn flexibility index $S=(A/T)\times 10^3$.

(14) Raw Yarn Strength Retention Rate

When the liquid-crystal polyester multifilament was twisted (twist coefficient: 80), the raw yarn strength retention rate was calculated using the raw yarn strength after the twisting in which the twist coefficient K (−) was 80, Y (N), and the raw yarn strength before the twisting, Z (N), by the following formula: raw yarn strength retention rate (%)=(Y/Z)×100. The twist coefficient K is a value determined using the twist number t (turns/m) and the total fineness T of the multifilament (dtex) by the formula: $t=K\times(100\div T^{0.5})$.

(15) Knot Strength

The knot strength was measured under the constant-speed elongation condition shown in the JIS L 1013 (2010) 8.6.1 standard time test. The sample was measured using "TENSILON" RTM-100 manufactured by ORIENTEC CORPORATION at a gripping interval of 250 mm and a tension rate of 50 ram/min. The stress at the time of breaking was regarded as the knot strength force, and the value obtained by dividing the knot strength force by the total fineness of the multifilament was regarded as the knot strength.

(16) Loop Strength

The loop strength was measured under the constant-speed elongation condition shown in the JIS L 1013 (2010) 8.7.1 standard time test. The sample was measured using "TENSILON" RTM-100 manufactured by ORIENTEC CORPORATION at a gripping interval of 250 mm and a tension rate of 50 mm/min. The stress at the time of breaking was regarded as the loop strength force, and the value obtained by dividing the loop strength force by the total fineness of two multifilaments was regarded as the loop strength.

(17) Evaluation of Process Passability

In the evaluation of the process passability of the liquid-crystal polyester multifilament in high-order processing, a package in which solid-phase polymerized was completed was installed vertically to the floor surface and subjected to vertical unwinding at 100 m/min, and the number of times the unwinding was stopped by catching the multifilament on the package was evaluated per 5,000 m of multifilament. The number of the stops was evaluated as S (especially good) when 0 to 2 times, A (good) when 3 to 5 times, B (somewhat bad) when 6 to 10 times, and C (bad) when 11 times or more, and in the case that the number of the stops of unwinding is 5 times or less (S and A), the multifilament was accepted.

(18) Tension and Coefficient of Variation in Tension during Twisting

In the measurement of the tension and the coefficient of variation in tension of the liquid-crystal polyester multifilament during twisting, the running tension of one liquid-crystal polyester multifilament to be used (each spindle) during twisting was measured for one minute, the detected tension (average) was regarded as the tension of one multifilament (each spindle), and the coefficient of variation in tension was calculated based on the running tensions of multifilaments (spindles) by the following formula: coefficient of variation in tension (%)=(standard deviation of running tensions of all spindles, σ (cN)÷average of running tensions of all spindles (cN)}×100.

(19) Suitability for High-Order Processed Product

The suitability of the twisted cord of liquid-crystal polyester multifilaments for high-order processed product was evaluated on 5 scales (suitable: 5 to unsuitable: 1) based on the product shape when the twisted cord was formed into the rope shape (extending degree of the single fiber in the radial direction of the rope), and in the case of evaluation result of 3 or more, the twisted cord was accepted. The rope was prepared as follows. First, using a twisting machine, 3 liquid-crystal polyester multifilaments are combined and single-twisted (twist coefficient K=25, twisting tension=0.3 cN/dtex, coefficient of variation in twisting tension=10%), and then 2 twisted cord that were single-twisted were combined and twisted in the twist direction opposite from the first twist direction (twist coefficient K=25, twisting tension=0.3 cN/dtex, coefficient of variation in twisting tension=10%) to prepare a twisted cord (=strand) including 6 liquid-crystal polyester multifilaments. A rope was prepared by braiding 12 strands prepared as described above.

Example 1

In a 5 L reaction vessel equipped with a stirring blade and a distilling tube, 870 parts by weight of p-hydroxybenzoic acid, 327 parts by weight of 4,4'-dihydroxybiphenyl, 157 parts by weight of isophthalic acid, 292 parts by weight of terephthalic acid, 89 parts by weight of hydroquinone, and 1,433 parts by weight of acetic anhydride (1.08 equivalents of total phenolic hydroxyl groups) were charged, the temperature was raised from room temperature to 145° C. for 30 minutes while the mixture was stirred under a nitrogen gas atmosphere, and then the mixture was reacted at 145° C. for 2 hours. Then, the temperature was raised to 330° C. for 4 hours. The polymerization temperature was kept at 330° C., the pressure was reduced to 1.0 mmHg (133 Pa) for 1.5 hours, the reaction was further continued for 20 minutes, and when a predetermined torque was reached, the polycondensation was completed. Next, the pressure inside the reaction vessel was increased to 1.0 kg/cm$^2$ (0.1 MPa), the polymer was discharged through a spinneret having one circular discharge port having a diameter of 10 mm to form a strand, and the strand was pelletized with a cutter.

In this liquid-crystal polyester, the proportion of the p-hydroxybenzoic acid unit (I) was 54 mol % based on the total, the proportion of the 4,4'-dihydroxybiphenyl unit (II) was 16 mol %, the proportion of the hydroquinone unit (III) was 7 mol %, the proportion of the terephthalic acid unit (IV) was 15 mol %, the proportion of the isophthalic acid unit (V) was 8 mol %, the melting point $T_{m2}$ was 315° C., and the melt viscosity measured with a Koka type flow tester at a temperature of 330° C. and a shear rate of 1,000/sec was 30 Pa·sec. Mw was 145,000.

The liquid-crystal polyester was vacuum dried at 120° C. for 12 hours to remove water and an oligomer. The moisture content of the liquid-crystal polyester at this time was 50 ppm. The dried liquid-crystal polyester was melt-extruded with a single-screw extruder (heater temperature: 290 to 340° C.), and the polymer was supplied to a spinning pack while measured with a gear pump. At this time, the spinning temperature from the extruder outlet to the spinning pack was 335° C. In the spinning pack, the polymer was filtered using a metal nonwoven fabric filter having a filtration accuracy of 15 μm, and discharged at a discharge rate of 100 g/min (0.33 g/min per single hole) from a spinneret having 300 holes having a hole diameter D of 0.13 mm and a land length L of 0.26 mm (L/D=2.0).

The liquid-crystal polyester multifilament was cooled and solidified at room temperature immediately after the discharge, and the 300 liquid-crystal polyester multifilaments were taken up by a Nelson roller at 600 m/min while an oil agent (component: polydimethylsiloxane ("SH200-350cSt" manufactured by Dow Corning Toray Co., Ltd.), oil agent concentration: 5.0% by weight water emulsion) was adhered to the liquid-crystal polyester multifilament using an oiling roller. The spinning draft at this time is 29.3. The oil agent adhesion amount was 1.5% by weight. The multifilament taken up by the Nelson roller was directly wound into a cheese shape using a feather traverse type winder through a dancer arm. The spinnability in the melt spinning was good, stable spinning of the liquid-crystal polyester multifilament having a total fineness of 1,670 dtex and a single fiber fineness of 5.6 dtex was possible without yarn breakage, and a raw yarn wound into a 4.0 kg package was obtained.

The fiber was unwound in the longitudinal direction (the direction perpendicular to the fiber circulation direction) from the spinning package, and rewound at 400 m/min with a winder in which the speed was kept constant (SSP-WV8P type precision winder manufactured by Kamitsu Seisakusho Ltd.). A stainless steel bobbin was used as the core material for the rewinding, the tension at the rewinding was 0.005 cN/dtex, the winding density was 0.50 g/cm$^3$, and the winding amount was 4.0 kg. The package shape was a taper end winding with a taper angle of 65°.

Solid-phase polymerization was performed under the condition in which the rewound package obtained was heated from room temperature to 240° C. using a closed oven, held at 240° C. for 3 hours, heated to 290° C., and further held at 290° C. for 20 hours. In the atmosphere in the solid-phase polymerization, dehumidified nitrogen was supplied at a flow rate of 100 L/min, and exhausted through an exhaust port so that the pressure inside the chamber was not increased.

The solid-phase polymerization package obtained in this way was attached to a delivery device that can be rotated by an inverter motor, and subjected to unwinding while the fiber was delivered at 200 m/min in the transverse direction (fiber circulation direction), a bearing roller guide (A312030) manufactured by YUASA YARN GUIDE ENGINEERING CO., LTD. was placed at a position where the yarn length was 50 cm, the fiber was bent in 4 directions (4 equal divisions) at a bending angle of 60°, and then wound into a product package by a winder. The physical properties of the fiber are as shown in Table 1. The liquid-crystal polyester multifilament obtained in Example 1 had a yarn flexibility index S of 6.6, a raw yarn strength retention rate of 73%, a knot strength of 8.4 cN/dtex, and a loop strength of 8.3 cN/dtex, and the process passability was "A".

Three of the obtained liquid-crystal polyester multifilaments were combined and single-twisted (twist coefficient K=25, tension during twisting=0.3 cN/dtex, coefficient of variation in twisting tension=10%) to prepare the twisted cord of liquid-crystal polyester multifilaments according to embodiments of the present invention. The obtained twisted cord had a coefficient of variation in cord diameters in a longitudinal direction of 28%, a cord strength of 28.6 cN/dtex, and a suitability for a high-order processed product of "3", and was suitable for use in general industrial applications.

Examples 2 to 4

A liquid-crystal polyester multifilament was obtained in the same manner as in Example 1 except that the bending was given during the unwinding of the solid-phase polymerization package in increased directions, that is, 8 directions (8 equal divisions), 18 directions (18 equal divisions), or 36 directions (36 equal divisions).

Examples 5 to 8

A liquid-crystal polyester multifilament was obtained in the same manner as in Examples 1 to 4 except that the thread guide used was changed to a bar guide (A707096) manufactured by YUASA YARN GUIDE ENGINEERING CO., LTD., and the bending direction was changed as shown in Table 1.

Examples 9 to 23

A liquid-crystal polyester multifilament was obtained in the same manner as in Example 3 except that the number of holes of the spinneret, the discharge rate, and the winding speed were adjusted so that the total fineness and the single fiber fineness of the liquid-crystal polyester multifilament were as shown in Table 2.

Example 24

A liquid-crystal polyester multifilament was obtained in the same manner as in Example 3 except that as the liquid-crystal polyester resin, a liquid-crystal polyester resin including 73 mol % of a p-hydroxybenzoic acid unit based on the whole and 27 mol % of a 6-hydroxy-2-naphthoic acid unit was used.

TABLE 1

| | | Example 1 | Example 2 | Example 3 | Example 4 | Example 5 | Example 6 | Example 7 | Example 8 |
|---|---|---|---|---|---|---|---|---|---|
| Spinning | Number of filaments | 300 | 300 | 300 | 300 | 300 | 300 | 300 | 300 |
| | Discharge rate (g/min) | 100 | 100 | 100 | 100 | 100 | 100 | 100 | 100 |
| | Taking-up speed (m/min) | 600 | 600 | 600 | 600 | 600 | 600 | 600 | 600 |
| | Total fineness T (dtex) | 1670 | 1670 | 1670 | 1670 | 1670 | 1670 | 1670 | 1670 |
| | Single fiber fineness (dtex) | 5.6 | 5.6 | 5.6 | 5.6 | 5.6 | 5.6 | 5.6 | 5.6 |
| | Oil agent component | Polydimethyl siloxane | Polydimethyl siloxane | Polydimethyl siloxane | Polydimethyl siloxane | Polydimethyl siloxane | Polydimethyl siloxane | Polydimethyl siloxane | Polydimethyl siloxane |
| Subsequent processing | Type of unwinding guide | Bearing roller guide | Bearing roller guide | Bearing roller guide | Bearing roller guide | Bar guide | Bar guide | Bar guide | Bar guide |
| | Number of bends | 4 | 8 | 18 | 36 | 4 | 8 | 18 | 36 |
| | Azimuth (°) | 0 to 270 (equally divided by 90°) | 0 to 315 (equally divided by 45°) | 0 to 340 (equally divided by 20°) | 0 to 350 (equally divided by 10°) | 0 to 270 (equally divided by 90°) | 0 to 315 (equally divided by 45°) | 0 to 340 (equally divided by 20°) | 0 to 350 (equally divided by 10°) |
| | Bending angle (°) | 60 | 60 | 60 | 60 | 60 | 60 | 60 | 60 |
| Physical properties of liquid-crystal multi-filament | Strength (cN/dtex) | 25.1 | 24.3 | 23.2 | 22.9 | 21.8 | 19.4 | 15.7 | 13.8 |
| | Elongation (%) | 2.90 | 2.86 | 2.81 | 2.78 | 2.75 | 2.53 | 2.31 | 2.24 |
| | Elastic modulus (cN/dtex) | 641 | 613 | 601 | 591 | 590 | 577 | 539 | 506 |
| | Flexing resistance value A (cN) | 11.04 | 8.33 | 6.62 | 6.20 | 10.13 | 7.64 | 6.55 | 6.03 |
| | Yarn flexibility index S | 6.6 | 5.0 | 4.0 | 3.7 | 6.1 | 4.6 | 3.9 | 3.6 |
| | Raw yarn strength retention rate (%) | 73 | 84 | 88 | 93 | 77 | 87 | 92 | 95 |
| | Knot strength (cN/dtex) | 8.4 | 8.9 | 10.2 | 10.2 | 7.9 | 7.7 | 7.6 | 7.1 |
| | Loop strength (cN/dtex) | 8.3 | 8.5 | 9.4 | 9.9 | 7.8 | 7.4 | 7.4 | 7.0 |
| | Process passability (times) | A (5) | S (2) | S (0) | S (0) | A (5) | S (1) | S (0) | S (0) |
| Physical properties of twisted cord | Coefficient of variation in cord diameters, X, of twisted cord (%) | 28 | 18 | 11 | 8 | 25 | 15 | 10 | 7 |
| | Strength of twisted cord (cN/dtex) | 28.6 | 26.4 | 25.5 | 24.6 | 23.5 | 21.7 | 17.5 | 15.2 |
| | Suitability for high-order processed product | 3 | 4 | 5 | 5 | 3 | 5 | 5 | 5 |

TABLE 2

| | | Example 9 | Example 10 | Example 11 | Example 12 | Example 13 | Example 14 | Example 15 | Example 16 |
|---|---|---|---|---|---|---|---|---|---|
| Spinning | Number of filaments | 150 | 75 | 50 | 600 | 500 | 400 | 6 | 16 |
| | Discharge rate (g/min) | 50 | 25 | 17 | 50 | 50 | 50 | 12 | 12 |
| | Taking-up speed (m/min) | 600 | 600 | 600 | 150 | 180 | 225 | 2000 | 1100 |
| | Total fineness T (dtex) | 840 | 420 | 280 | 3330 | 2780 | 2220 | 60 | 110 |
| | Single fiber fineness (dtex) | 5.6 | 5.6 | 5.6 | 5.6 | 5.6 | 5.6 | 3.8 | 6.9 |

TABLE 2-continued

|  |  |  |  |  |  |  |  |  |  |
|---|---|---|---|---|---|---|---|---|---|
| Subsequent processing | Oil agent component | Polydimethyl siloxane | Polydimethyl siloxane | Polydimethyl siloxane | Polydimethyl siloxane | Polydimethyl siloxane | Polydimethyl siloxane | Polydimethyl siloxane | Polydimethyl siloxane |
|  | Type of unwinding guide | Bearing roller guide | Bearing roller guide | Bearing roller guide | Bearing roller guide | Bearing roller guide | Bearing roller guide | Bearing roller guide | Bearing roller guide |
|  | Number of bends | 18 | 18 | 18 | 18 | 18 | 18 | 18 | 18 |
|  | Azimuth (°) | 0 to 340 (equally divided by 20°) | 0 to 340 (equally divided by 20°) | 0 to 340 (equally divided by 20°) | 0 to 340 (equally divided by 20°) | 0 to 340 (equally divided by 20°) | 0 to 340 (equally divided by 20°) | 0 to 340 (equally divided by 20°) | 0 to 340 (equally divided by 20°) |
|  | Bending angle (°) | 60 | 60 | 60 | 60 | 60 | 60 | 60 | 60 |
| Physical properties of liquid-crystal multi-filament | Strength (cN/dtex) | 23.6 | 23.7 | 23.5 | 23.6 | 23.8 | 24.0 | 26.2 | 25.6 |
|  | Elongation (%) | 2.83 | 2.84 | 2.85 | 2.83 | 2.84 | 2.86 | 2.96 | 2.92 |
|  | Elastic modulus (cN/dtex) | 613 | 622 | 619 | 623 | 611 | 626 | 641 | 633 |
|  | Flexing resistance value A (cN) | 3.11 | 1.59 | 1.07 | 13.11 | 10.65 | 8.36 | 0.22 | 0.44 |
|  | Yarn flexibility index S | 3.7 | 3.8 | 3.8 | 3.9 | 3.8 | 3.8 | 3.7 | 4.0 |
|  | Raw yarn strength retention rate (%) | 93 | 91 | 92 | 90 | 89 | 90 | 92 | 89 |
|  | Knot strength (cN/dtex) | 11.4 | 10.9 | 10.5 | 11.0 | 11.1 | 10.8 | 12.0 | 11.0 |
|  | Loop strength (cN/dtex) | 10.8 | 10.2 | 10.5 | 11.2 | 11.1 | 10.9 | 12.0 | 11.1 |
|  | Process passability (times) | S (0) | S (0) | S (0) | S (0) | S (0) | S (0) | S (0) | S (0) |
| Physical properties of twisted cord | Coefficient of variation in cord diameters, X, of twisted cord (%) | 8 | 9 | 9 | 10 | 10 | 8 | 7 | 11 |
|  | Strength of twisted cord (cN/dtex) | 25.9 | 26.0 | 25.7 | 26.0 | 25.8 | 25.8 | 26.2 | 25.8 |
|  | Suitability for high-order processed product | 5 | 5 | 5 | 5 | 5 | 5 | 5 | 5 |

|  |  | Example 17 | Example 18 | Example 19 | Example 20 | Example 21 | Example 22 | Example 23 | Example 24 |
|---|---|---|---|---|---|---|---|---|---|
| Spinning | Number of filaments | 16 | 600 | 300 | 75 | 38 | 50 | 50 | 300 |
|  | Discharge rate (g/min) | 12 | 50 | 50 | 50 | 50 | 50 | 50 | 100 |
|  | Taking-up speed (m/min) | 700 | 600 | 600 | 600 | 600 | 220 | 150 | 600 |
|  | Total fineness T (dtex) | 170 | 840 | 840 | 840 | 840 | 2270 | 3330 | 1670 |
|  | Single fiber fineness (dtex) | 10.6 | 1.4 | 2.8 | 11.2 | 22.1 | 45.4 | 66.6 | 5.6 |
| Subsequent processing | Oil agent component | Polydimethyl siloxane | Polydimethyl siloxane | Polydimethyl siloxane | Polydimethyl siloxane | Polydimethyl siloxane | Polydimethyl siloxane | Polydimethyl siloxane | Polydimethyl siloxane |
|  | Type of unwinding guide | Bearing roller guide | Bearing roller guide | Bearing roller guide | Bearing roller guide | Bearing roller guide | Bearing roller guide | Bearing roller guide | Bearing roller guide |
|  | Number of bends | 18 | 18 | 18 | 18 | 18 | 18 | 18 | 18 |
|  | Azimuth (°) | 0 to 340 (equally divided by 20°) | 0 to 340 (equally divided by 20°) | 0 to 340 (equally divided by 20°) | 0 to 340 (equally divided by 20°) | 0 to 340 (equally divided by 20°) | 0 to 340 (equally divided by 20°) | 0 to 340 (equally divided by 20°) | 0 to 340 (equally divided by 20°) |
|  | Bending angle (°) | 60 | 60 | 60 | 60 | 60 | 60 | 60 | 60 |
| Physical properties of liquid-crystal multi-filament | Strength (cN/dtex) | 25.5 | 26.2 | 24.0 | 23.8 | 23.8 | 23.2 | 23.3 | 24.6 |
|  | Elongation (%) | 2.92 | 2.96 | 2.86 | 2.82 | 2.80 | 2.83 | 2.83 | 3.51 |
|  | Elastic modulus (cN/dtex) | 636 | 639 | 631 | 618 | 622 | 622 | 623 | 468 |
|  | Flexing resistance value A (cN) | 0.67 | 2.65 | 3.02 | 3.19 | 3.31 | 14.56 | 23.59 | 8.72 |
|  | Yarn flexibility index S | 3.9 | 3.2 | 3.6 | 3.8 | 3.9 | 6.4 | 7.1 | 5.2 |
|  | Raw yarn strength retention rate (%) | 90 | 91 | 94 | 92 | 90 | 78 | 73 | 82 |
|  | Knot strength (cN/dtex) | 10.8 | 12.2 | 12.0 | 11.5 | 11.2 | 7.6 | 7.2 | 7.9 |
|  | Loop strength (cN/dtex) | 10.8 | 12.3 | 11.6 | 11.0 | 9.9 | 7.7 | 7.3 | 7.9 |
|  | Process passability (times) | S (0) | S (0) | S (0) | S (0) | S (0) | A (3) | A (4) | A (4) |
| Physical properties of twisted cord | Coefficient of variation in cord diameters, X, of twisted cord (%) | 12 | 5 | 7 | 9 | 10 | 24 | 29 | 19 |
|  | Strength of twisted cord (cN/dtex) | 26.2 | 26.4 | 26.4 | 26.2 | 26.2 | 24.0 | 23.2 | 27.4 |

TABLE 2-continued

| | | | | | | | | |
|---|---|---|---|---|---|---|---|---|
| Suitability for high-order processed product | 5 | 5 | 5 | 5 | 5 | 5 | 4 | 4 |

The physical properties of the fiber in Examples 1 to 24 are shown in Tables 1 and 2.

Comparative Examples 1 to 3

A liquid-crystal polyester multifilament was obtained in the same manner as in Example 1 except that no bending was given during the unwinding of the solid-phase polymerization package, or bending was given in one direction or two directions (two equal divisions).

Comparative Examples 4 to 5

A liquid-crystal polyester multifilament was obtained in the same manner as in Example 1 except that the bending was given during the unwinding of the solid-phase polymerization package in 18 directions (18 equal divisions), and the bending angle at the bending was 10° or 20°.

The physical properties of the fiber in Comparative Examples 1 to 5 are shown in Table 3.

As is clear from Examples 1 to 24 in Tables 1 and 2, it was possible to make the liquid-crystal polyester multifilament flexible by bending the liquid-crystal polyester multifilament in a plurality of directions when the package of the liquid-crystal polyester multifilament in which the solid-phase polymerization was completed was subjected to unwinding, and it was possible to obtain a twisted cord of liquid-crystal polyester multifilaments having a coefficient of variation in cord diameters in a longitudinal direction, X, of less than 30%, according to embodiments of the present invention, by twisting the liquid-crystal polyester multifilament. In Examples 2 to 4, 6 to 21, and 24, the liquid-crystal polyester multifilament was made particularly flexible, so that the followability (deformation property) of each single fiber during twisting was further improved, and it was possible to significantly reduce the coefficient of variation in cord diameters, X, of the obtained twisted cord of liquid-crystal polyester multifilaments.

TABLE 3

| | | Comparative Example 1 | Comparative Example 2 | Comparative Example 3 | Comparative Example 4 | Comparative Example 5 |
|---|---|---|---|---|---|---|
| Spinning | Number of filaments | 300 | 300 | 300 | 300 | 300 |
| | Discharge rate (g/min) | 100 | 100 | 100 | 100 | 100 |
| | Taking-up speed (m/min) | 600 | 600 | 600 | 600 | 600 |
| | Total fineness T (dtex) | 1670 | 1670 | 1670 | 1670 | 1670 |
| | Single fiber fineness (dtex) | 5.6 | 5.6 | 5.6 | 5.6 | 5.6 |
| | Oil agent component | Polydimethyl siloxane | Polydimethyl siloxane | Polydimethyl siloxane | Polydimethyl siloxane | Polydimethyl siloxane |
| Subsequent processing | Type of unwinding guide | Bearing roller guide | Bearing roller guide | Bearing roller guide | Bearing roller guide | Bearing roller guide |
| | Number of bends | 0 | 1 | 2 | 18 | 18 |
| | Azimuth (°) | — | 0 | 0, 180 | 0 to 340 (equally divided by 20°) | 0 to 340 (equally divided by 20°) |
| | Bending angle (°) | — | 60 | 60 | 10 | 20 |
| Physical properties of liquid-crystal multifilament | Strength (cN/dtex) | 25.1 | 24.3 | 23.2 | 25.2 | 24.6 |
| | Elongation (%) | 2.90 | 2.86 | 2.81 | 2.93 | 2.83 |
| | Elastic modulus (cN/dtex) | 641 | 613 | 601 | 643 | 651 |
| | Flexing resistance value A (cN) | 16.45 | 15.19 | 14.34 | 14.97 | 13.93 |
| | Yarn flexibility index S | 9.9 | 9.1 | 8.6 | 9.0 | 8.3 |
| | Raw yarn strength retention rate (%) | 57 | 59 | 67 | 65 | 69 |
| | Knot strength (cN/dtex) | 5.1 | 5.5 | 6.1 | 6.0 | 6.4 |
| | Loop strength (cN/dtex) | 5.0 | 5.3 | 6.1 | 5.8 | 6.3 |
| | Process passability (times) | C (21) | C (16) | B (9) | C (13) | B (7) |
| Physical properties of twisted cord | Coefficient of variation in cord diameters, X, of twisted cord (%) | 49 | 44 | 40 | 43 | 37 |
| | Strength of twisted cord (cN/dtex) | 18.6 | 16.8 | 15.3 | 18.8 | 17.4 |
| | Suitability for high-order processed product | 1 | 1 | 2 | 2 | 2 |

As described above, because the twisted cord of liquid-crystal polyester multifilaments according to embodiments of the present invention has a coefficient of variation in cord diameters in a longitudinal direction, X, of less than 30% and has a uniform cord diameter in the longitudinal direction, the twisted cord gives various high-order processed products capable of retaining desired product shapes, and is suitable for use in general industrial material applications such as high-strength ropes, slings, and nets. Furthermore, the liquid-crystal polyester multifilament used in the twisted cord of liquid-crystal polyester multifilaments according to embodiments of the present invention has yarn flexibility, so that when one or a plurality of liquid-crystal polyester multifilaments are twisted, the followability (deformation property) of each single fiber to the twisting is very high, and each single fiber is uniformly twisted in the twisted cord. As a result, the difference in yarn length is remarkably improved between the single fibers, and the stress applied from the outside is uniformly dispersed over all the single fibers included in the twisted cord to remarkably improve the strength of the twisted cord.

On the other hand, as is clear from Comparative Examples 1 to 5 in Table 3, in the case that the liquid-crystal polyester multifilament was not bent or was insufficiently bent when the package in which the solid-phase polymerization was completed was subjected to unwinding, it was impossible to make the liquid-crystal polyester multifilament flexible, and the obtained yarn was rigid. In the case that such a liquid-crystal polyester multifilament was twisted, the obtained twisted cord of liquid-crystal polyester multifilaments had a coefficient of variation in cord diameters in a longitudinal direction, X, of 30% or more, and the various high-order processed products formed with the twisted cord did not retain desired product shapes. Furthermore, because the difference in yarn length occurred in the twisted cord, the stress applied from the outside easily concentrated on the stretched single fiber, and the strength of the twisted cord was small, so that the sufficient product strength was not obtained. As described above, if the coefficient of variation in cord diameters in a longitudinal direction, X, is 30% or more, an effect intended by the present invention cannot be obtained.

Because the twisted cord of liquid-crystal polyester multifilaments according to embodiments of the present invention has a uniform cord diameter in the longitudinal direction, the twisted cord gives various high-order processed products capable of retaining desired product shapes, and is suitable for use in general industrial material applications such as high-strength ropes, slings, and nets.

The invention claimed is:

1. A twisted cord of liquid-crystal polyester multifilaments, the twisted cord having a coefficient of variation in cord diameters in a longitudinal direction, X, of less than 30%, the coefficient of variation in cord diameters that is calculated from (Formula 1) described below:

Coefficient of variation in cord diameters, $X$ (%)={standard deviation of cord diameters in a longitudinal direction, $\sigma$ (mm)÷average cord diameter, $D$ (mm)}×100      (Formula 1).

2. The twisted cord of liquid-crystal polyester multifilaments according to claim 1, the twisted cord having a strength of 12 cN/dtex or more.

3. The twisted cord of liquid-crystal polyester multifilaments according to claim 1, wherein the liquid-crystal polyester includes structural units (I), (II), (III), (IV), and (V) described below

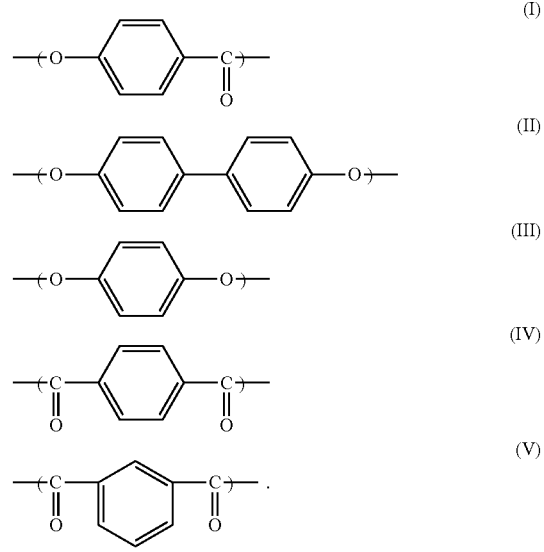

4. The twisted cord of liquid-crystal polyester multifilaments according to claim 3, wherein a proportion of the structural unit (I) is 40 to 85 mol % based on a total of the structural units (I), (II), and (III), and a proportion of the structural unit (II) is 60 to 90 mol % based on a total of the structural units (II) and (III), and a proportion of the structural unit (IV) is 40 to 95 mol % based on a total of the structural units (IV) and (V).

5. A method for producing the twisted cord of liquid-crystal polyester multifilaments according to claim 1, the method comprising twisting a liquid-crystal polyester multifilament having a yarn flexibility index S of 8.0 or less.

6. The method according to claim 5, wherein a liquid-crystal polyester is melt-spun and then wound into a package, the package is subjected to solid-phase polymerization, a liquid-crystal polyester multifilament is unwound from the package in which the solid-phase polymerization is completed, such that the liquid-crystal polyester multifilament is bent in at least four directions, then the liquid-crystal polyester multifilament is wound again, and one or more of a plurality of the liquid-crystal polyester multifilaments are twisted to form the twisted cord.

7. The method according to claim 5, wherein a tension of 0.01 to 1.0 cN/dtex is applied during twisting, and a coefficient of variation in tension is less than 30%.

8. A rope, a sling, or a net comprising the twisted cord of liquid-crystal polyester multifilaments according to claim 1.

9. A tension member comprising the twisted cord of liquid-crystal polyester multifilaments according to claim 1.

10. A woven or knitted fabric comprising the twisted cord of liquid-crystal polyester multifilaments according to claim 1.

11. A fiber-reinforced resin product or a resin molded product comprising the twisted cord of liquid-crystal polyester multifilaments according to claim 1.

* * * * *